April 30, 1935.  A. B. DUMONT  1,999,407
ELECTRON TURBINE
Filed Jan. 31, 1930   5 Sheets-Sheet 1

INVENTOR
BY DARBY & DARBY
His ATTORNEYS

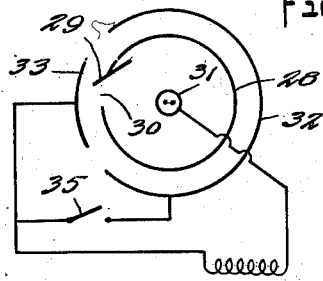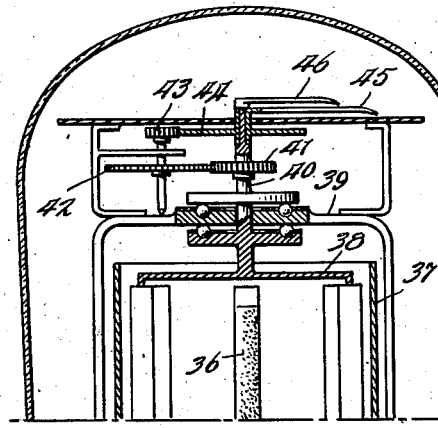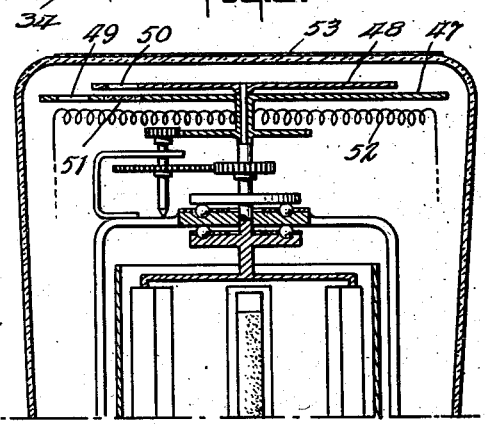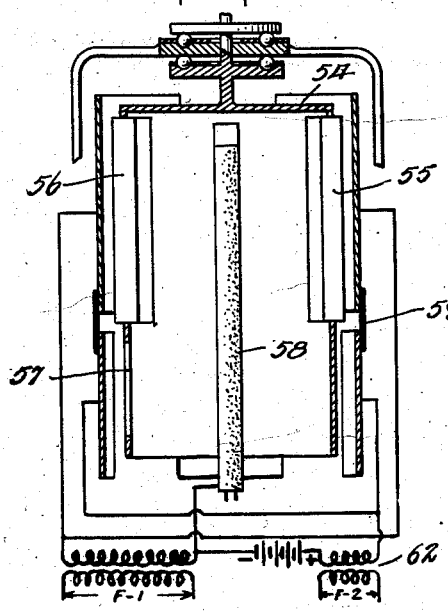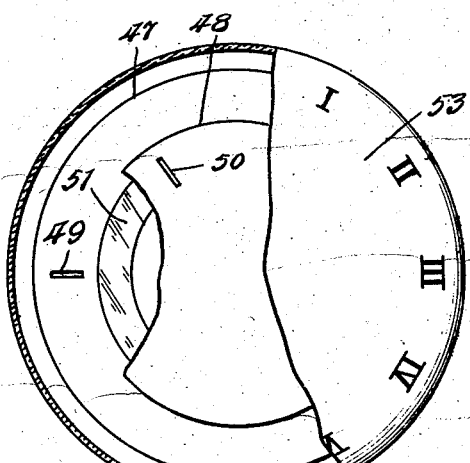

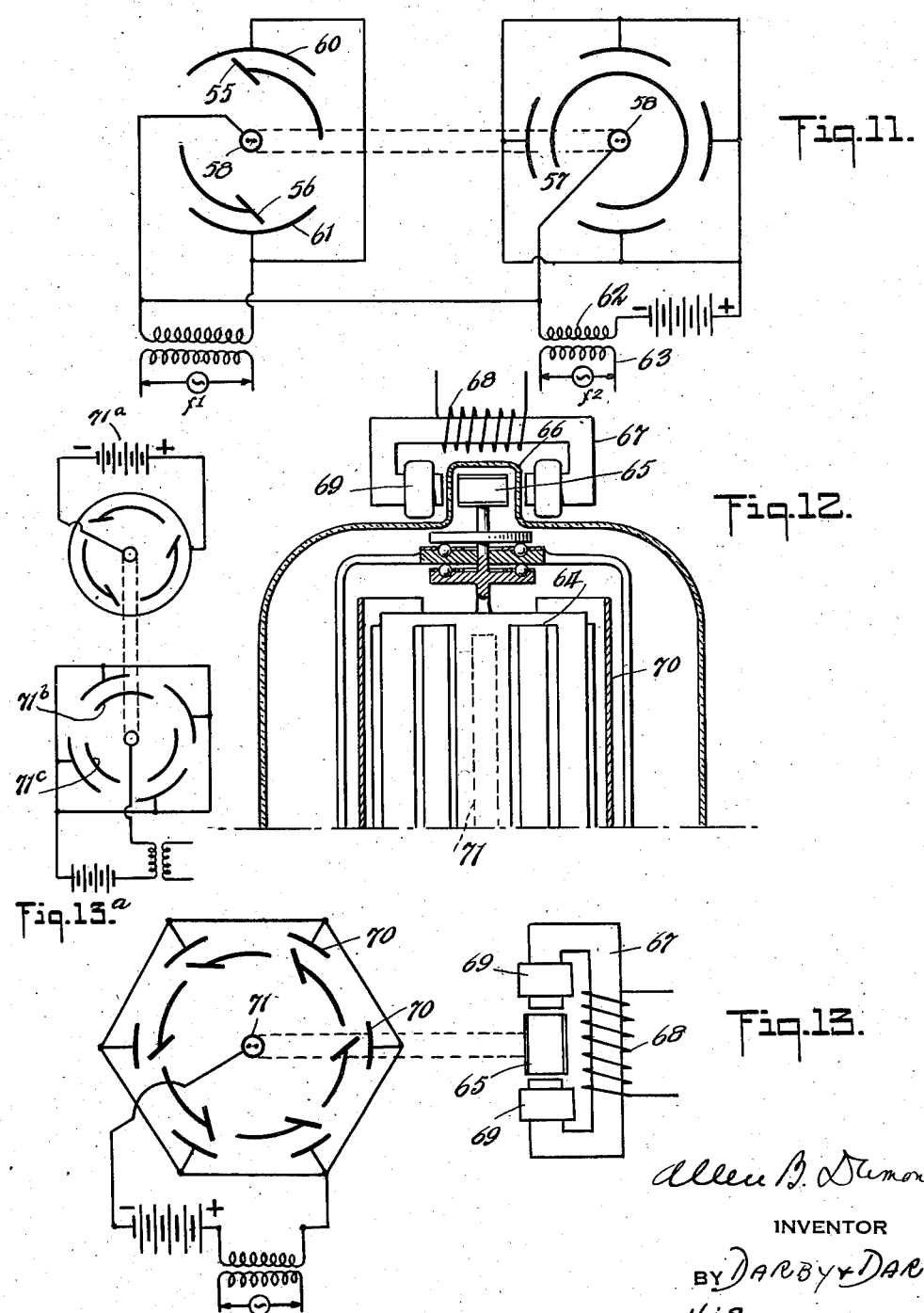

April 30, 1935.　　　A. B. DUMONT　　　1,999,407
ELECTRON TURBINE
Filed Jan. 31, 1930　　　5 Sheets-Sheet 4

Allen B. Dumont
INVENTOR
BY DARBY & DARBY
His ATTORNEYS

April 30, 1935.  A. B. DUMONT  1,999,407
ELECTRON TURBINE
Filed Jan. 31, 1930    5 Sheets-Sheet 5
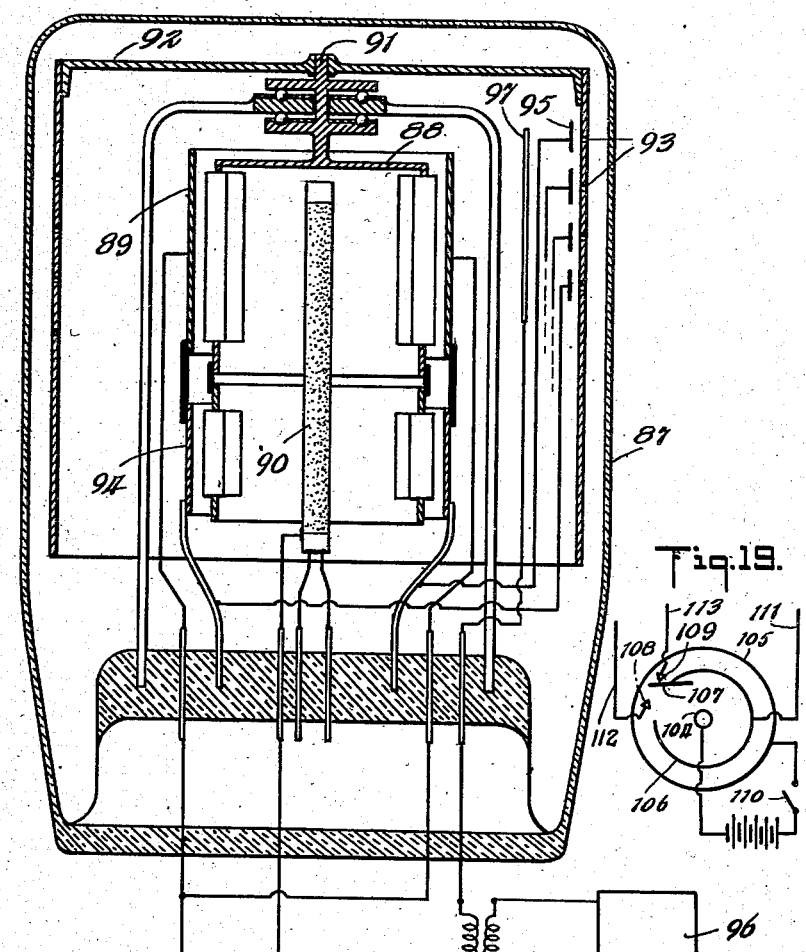
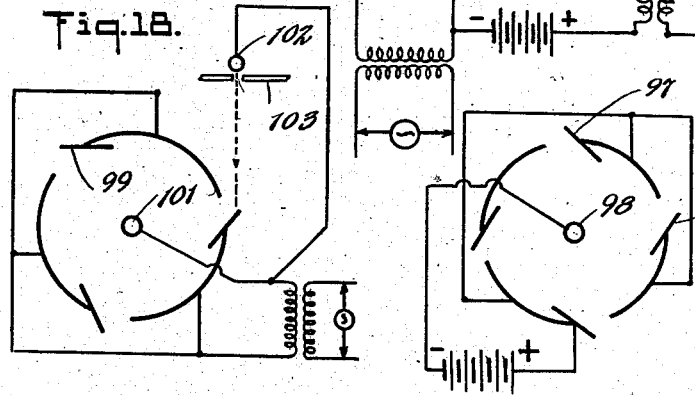

Patented Apr. 30, 1935

1,999,407

UNITED STATES PATENT OFFICE 1,999,407

ELECTRON TURBINE

Allen B. Dumont, Upper Montclair, N. J.

Application January 31, 1930, Serial No. 425,025

7 Claims. (Cl. 250—27.5)

This invention relates to space discharge devices, and with particularity to methods and means for utilizing an electronic or ionic stream.

An object of the invention is to provide a new method of employing an electronic or ionic stream to effect mechanical movement.

Another object of the invention is to provide methods and means for utilizing the electronic or ionic stream in the production of currents of any desired wave, shape or frequency.

Another object of the invention is to provide methods and means for utilizing an electronic or ionic stream to effect switching or commutating actions.

Another object of the invention relates to the method of utilizing an electronic or ionic stream to convert a current having one characteristic into a current having a different characteristic.

A further object is to provide a novel type of electronically or ionically driven motive source.

A feature of the invention relates to a motor which derives its motive power mainly from the kinetic energy of moving electric particles such as electrons, ions, etc.

Another feature relates to an electron discharge device having an anode and an emitting cathode, together with a member rotatably mounted between the anode and cathode whereby the kinetic energy of the electron emission is converted into a mechanical rotation of said member.

Another feature relates to an electron discharge device having therein a member adapted to be driven by an electronic or ionic stream produced between a pair of cooperating electrodes and another pair of electrodes adapted to have the electronic stream therebetween varied by rotation of said member.

Another feature of the invention relates to an electron discharge device having an electron emissive cathode and a pair of anodes common to said cathode, together with a pair of movable members rotatable as a unit between both said pairs of electrodes.

Another feature of the invention relates to an electron discharge device having means for producing an electron stream together with a pair of members adapted to move transversely with relation to said stream, one of said members having applied thereto current of one frequency and the other of said members controlling a generation of currents of different frequency.

A further feature relates to a novel type of synchronous motor deriving its motive power mainly from the kinetic energy of a moving electronic or ionic stream.

A further feature relates to a novel form of indicating device such as a clock, speedometer, tachometer, odometer, etc., deriving motive power mainly from the kinetic energy of an electronic or ionic stream.

A further feature relates to the manner of employing the kinetic energy of an electron or ionic stream to effect a switching or commutating action.

A further feature relates to television scanning or reproducing devices wherein the rotatable scanner or analyzing member is driven mainly by the kinetic energy of an electronic or ionic stream.

A further feature relates to a television scanner which is mounted for rotation within an evacuated container.

A further feature relates to a television reproducing device wherein the scanner or analyzing member and the reproducing light source are mounted within a single evacuated envelope.

A further feature relates to the method of generating electric currents and controlling the wave shape of the currents so generated.

A further feature relates to an electric motor which may be operated by alternating current of any frequency within a very wide range.

Other features and advantages not specifically enumerated will be apparent after a consideration of the following detail descriptions and the appended claims.

While several aspects of the invention will be disclosed hereinafter in certain specific embodiments, it will be understood that this is done merely for the purpose of explaining the invention. It is to be understood therefore that the broad features of the invention are capable of embodiment in a variety of forms and in general the invention possesses useful advantages in any situation where an efficient electro-motor is required.

Broadly stated therefore the invention contemplates the utilizing of the kinetic energy of moving particles such as electrons or the like to effect a mechanical movement or rotation of a driving shaft or similar element.

Referring to the drawings:

Fig. 6 shows schematically an arrangement for starting a motor such as shown in Figs. 1 to 5, but wherein the movable member is provided with a small number of slots;

Fig. 7 shows the invention embodied in an indicating mechanism such as a clock;

Fig. 8 shows a modified form of the clock shown in Fig. 7;

Fig. 9 is a top plan view of the clock of Fig. 8 with the parts broken away to show more clearly the dial and rotating discs for controlling the movable light pointers;

Fig. 10 shows the invention embodied in a device for changing the frequency of an electric current or potential;

Fig. 11 is a schematic development of the device shown in Fig. 10;

Fig. 12 shows the invention embodied in a device for generating currents;

Fig. 13 is a schematic development of the device shown in Fig. 12;

Fig. 13A shows schematically an arrangement for converting direct currents into alternating currents;

Fig. 16 shows the invention embodied in another type of television device;

Fig. 17 shows a modified form of motor employing the movable member as an anode; and Fig. 18 shows schematically another manner of driving the movable member according to the invention; and Fig. 19 shows schematically how the invention can be embodied in a relay.

Figure 1:
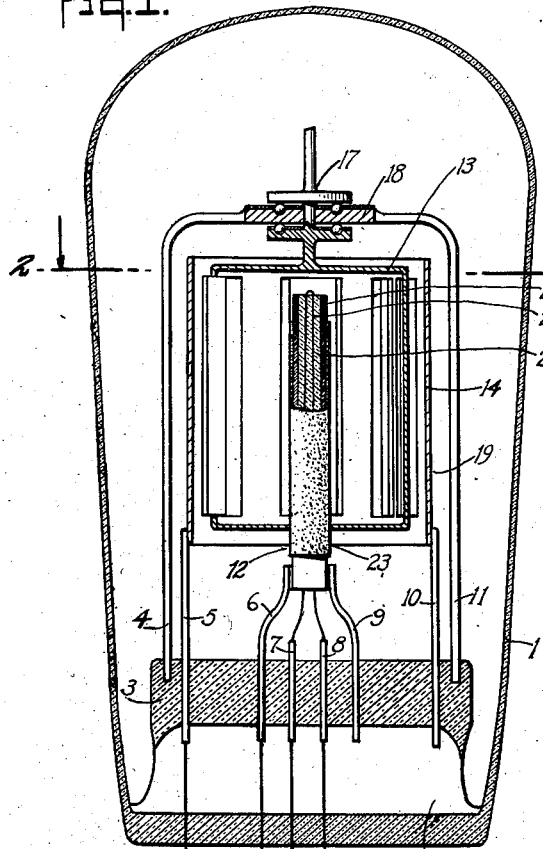
Fig. 1 shows a view in elevation and partly in section of one simple manner of constructing an electric motor embodying features of the invention.
Figure 2:
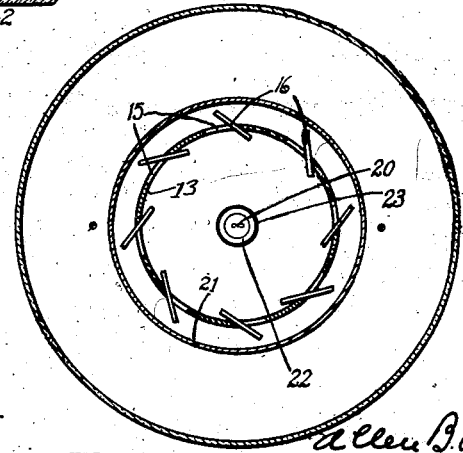
Fig. 2 is a sectional view of the device shown in Fig. 1 taken along the line 2—2 thereof.

Referring more particularly to Figs. 1 and 2 the numeral 1 represents an evacuated envelope of any desired shape or configuration to serve as an enclosure for the motor parts and mechanism to be described. While the envelope is shown as having the shape usually employed for audions it will be understood that any other shape may be employed. When an audion shape is employed the envelope is provided with a re-entrant portion 2 and a "press" portion 3 into which are sealed the wires 4 to 11 inclusive in any well known manner. Wires 5 to 10 inclusive extend outwardly through the press and provide lead-in connections to the various elements. These elements comprise an electron emitting member designated generally by numeral 12, a rotatable cage-like member 13, and a fixed cylindrical member 14.

The cylindrical wall of movable member 13 is provided with a plurality of openings or windows 15 to the edges of which are attached in any suitable manner a plurality of vanes 16, preferably, although not necessarily, at an angle of 45° to the radial line extending through the center of the vane. The movable member 13 has attached thereto at the top, a shaft 17 which is mounted for anti-frictional rotation in a bearing plate 18. Plate 18 is attached, preferably in a horizontal position to the bent over ends of the wires 4 and 11 as shown in Fig. 1. Surrounding member 13 is the plate member 14 which is supported on the wires 5 and 10.

While the electron emitter 12 may be of any well known type, it is preferred to employ a so-called indirectly heated cathode, comprising the looped heater filament 20 passing through the twin-bore insulator rod 21. A metallic sleeve 22 surrounds the rod 21 and is provided with a suitable electron emissive coating 23. When a potential is applied to the member 14 and the filament 20 is heated radial streams of electrons are given off from the member 12 and move with increasing velocity towards the member 14 which acts as an anode. These streams of electrons impinge upon the vanes 16 and cause member 13 and shaft 17 to be continuously rotated in the direction of the arrow. Since the power derived is dependent upon the number of electrons emitted in unit time, and also upon their velocity, it is preferred to employ a cathode having a large actively emitting area, and to impress a corresponding high potential on member 14. Where the member 13 is to be driven by a pure electron discharge then the envelope 1 will be evacuated to a very low pressure such as ordinarily employed in present day radio tubes or audions. It will be understood, however, that the envelope may have a filling of a gas or vapor, such as mercury vapor so that the number of electric particles striking the vanes is increased.

While Fig. 1 shows the anode member energized from a source of alternating current, it will be understood that the potential applied to member 14 may be a steady or direct potential. Furthermore the member 13 can be rotated by potential of any frequency applied to member 14 thus enabling the motor to be used under a variety of conditions not attainable with ordinary electric motors. Furthermore the motor parts being enclosed within an evacuated and sealed vessel are weather proof, waterproof, and losses resulting from windage are entirely avoided.

While the preferred manner of producing the electronic or ionic stream is to employ thermionic means, it will be understood that any other method of producing electron streams may be utilized. The member 12 may even be provided with a radium coating or other coating capable of giving off electric particles.

Figure 3:
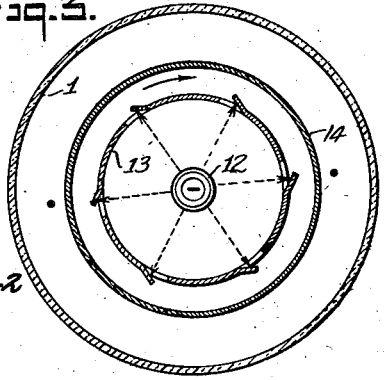
Fig. 3 shows another embodiment of the movable member shown in Figs. 1 and 2; this figure also illustrates schematically the effect of the electron streams on the vanes of the movable member.

While one specific structure of the member 13 is shown, it will be clear that the invention is not limited thereto. Thus instead of attaching the vanes to the member 13, these vanes may be formed integrally with said member by punching operation to produce a structure such as shown in Fig. 3.

Figure 4:
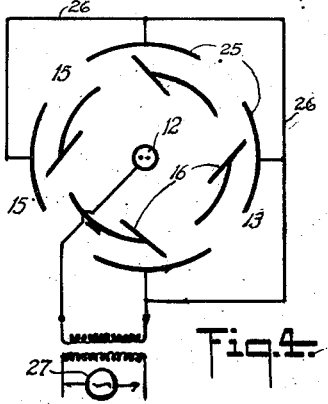
Fig. 4 shows an embodiment of the invention in the form of an electronically driven synchronous motor.
Figures 1A, 5:
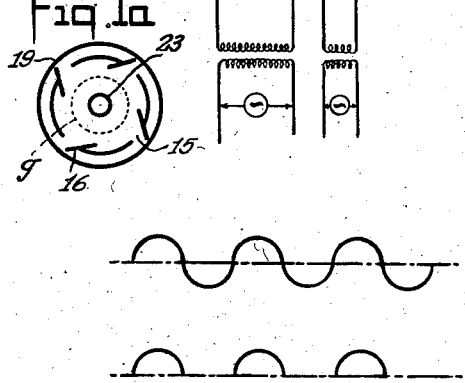
Fig. 5 shows the rectifying action of the movable member of Fig. 4.

Referring to Figs. 4 and 5 an explanation will now be given of a synchronous motor embodying principles of the invention. The general arrangement and mounting of the parts is the same as that shown in Fig. 1. In this embodiment the anode member 14 instead of being completely cylindrical is in the form of a plurality of cylindrical sectors 25 equal in number to the vanes 16. A central electron emitting cathode 12 is provided similar to the cathode of Fig. 1. As shown in Fig. 4, the several cylindrical sectors 25 are electrically connected together by wires 26 and to one terminal of an alternating current source 27, the other terminal of this source being connected to the cathode 12. Assuming that the source 27 has a frequency of 60 cycles per second as represented in the upper curve of Fig. 5, then member 13 will start rotating and will accelerate until it runs synchronously with the supply frequency. Inasmuch as the current flows in only one direction between the cathode and anode, only the positive half-waves as indicated in the lower curve of Fig. 5 are utilized to project electrons against the vanes 16, and consequently each positive half-wave will tend to keep each of the slots or windows opposite to one of the sectors 25. Thus in the example illustrated in Fig. 4 where there are four segments and four windows, the member will run synchronously at 900 R. P. M. While any desired width may be given to the windows 15, it is preferred to make the windows and segments of the same angular width. To express the matter generally, if there are "$n$" windows and "$n$" anode segments and "$F$" is the frequency in cycles per minute, then the motor member will revolve at $$\frac{F}{n} \text{ R. P. M.}$$

When the motor is provided with a very small number of anode sectors and vanes it may be found desirable to provide separate means for starting and bringing the rotor up to synchronism. One simple arrangement for effecting this is illustrated in Fig. 6 wherein there is shown diagrammatically an electron motor having a rotor 28 with a single vane 29 and a single window 30. An electron emitting cathode 31 is provided, as in the preceding figures, but the anode member 32 extends around the greater part of the member 28 except for a small separate sector portion 33. The source of alternating current 34 is impressed across the main anode 32 and cathode. A switch 35 is provided for electrically connecting the sector 33 to the anode 32 thus causing the member 28 to start up and run as a motor. When synchronous speed is attained, switch 35 is opened and member 28 will then continue to run synchronously with the supply source 34. While this figure shows a single vane and single anode motor, it will be understood that the principle of connecting all the anode sectors together applies to any other arrangement, thus in Fig. 4 an additional set of sectors may be provided between the seectors 25, these latter sectors being switched on only in starting the motor.

Referring to Fig. 7 there is shown a clock driven by an electronic motor, the motor is similar to the motors hereinabove described, comprising an electron emitting cathode 36, a cylindrical anode member 37, and a rotatable vane member 38. The member 38 is mounted antifrictionally on the support 39 as hereinabove described, and is provided with a driving shaft 40. Shaft 40 has attached thereto the gear 41 which through any well known gear train 42, 43, 44 drives the minute hand 45, the hour hand 46 being fastened to the shaft 40. The entire clock is enclosed within the container 47 which is evacuated to a very low degree and if desired provided with a filling of gas or vapor to increase the electron emission. The member 36 may be rendered thermionically active in any well known manner, such as disclosed in Fig. 1, and the anode member 37 may be connected to any suitable source, preferably of high potential. It is preferred to apply an alternating potential to member 37 which may be designed to run as a synchronous motor as disclosed in connection with Fig. 4. There is thus provided a clock which is simple of construction and highly accurate since the rotor member 38 may be of very light material eliminating hunting and other disadvantages attendant upon using ordinary electric motors for driving the clock.

Referring to Figs. 8 and 9 there is shown a modified form of clock. The motive means and arrangements are the same as disclosed in Fig. 7. In this embodiment the hands 45, 46 of Fig. 7 are replaced by a pair of discs 47 and 48. Disc 47 corresponds to the minute hand while disc 48 corresponds to the hour hand 46. Each disc is provided with a slot 49, 50, respectively. The slot 50 in disc 48 is disposed in registry with an annular transparent strip 51 in disc 47, and a source of light such as a coiled filament 52 is adapted to illuminate the lower face of disc 47. Consequently as the discs rotate there are projected upon the dial face 53 two moving light beams passing respectively through the slots 49 and 50. The discs 47 and 48 may be made out of any suitable material such as glass, celluloid, etc., it being understood that the lower disc 47 is treated to render it opaque for the annular portion 51.

Referring to Figs. 10 and 11 a description will now be given of a frequency-changer embodying features of the invention. Fig. 10 shows the general construction with the enclosing envelope omitted for the sake of clarity. In this embodiment there is provided a rotor member 54 which differs from the rotor members of the preceding figures in that it is provided with two sets of windows one set disposed above the other. Thus the upper set is represented in the drawing by numerals 55, 56, while the lower set comprises in the embodiment shown, a single window 57. It will be understood of course that the ratio of the number of windows in one set to those in the other will be determined by the desired ratio of frequency change desired. Disposed centrally within the rotor is an electron emitter 58, preferably of the type hereinabove described. It will be understood that the cathode member 58 and the rotor 54 are mounted substantially the same as the corresponding members of Fig. 1. Surrounding the rotor 54 and stationarily mounted within the evacuated envelope are a pair of anodes which are preferably insulatingly united by means of insulating rings 59. The upper anode is formed in a plurality of cylindrical sectors as described in connection with Fig. 4. The number of these sectors being determined by the synchronous speed at which the rotor is to run as already described. Thus as shown in the left hand portion of the developed view of Fig. 11 the upper anode is made in two cylindrical sectors 60 and 61, while the lower anode represented in the right hand portion of Fig. 11 is formed with four cylindrical sectors. F—1 represents the source of current having a frequency which for example is required to be changed to a frequency F—2. The periodically varying potentials from source F—1 are impressed across the upper anode and the common cathode 58 thus causing the rotor 54 to revolve in synchronism with the supply F—1. As hereinabove set forth and assuming the supply F—1 has a 60 cycle per second frequency, then with the structure shown the rotor 54 will rotate synchronously at a rate of 1800 R. P. M. Consequently there will be generated in the primary of transformer 62 a current having a frequency of 120 cycles per second since four impulses will flow between the cylindrical sectors of the lower anode and the cathode 58 for each revolution of member 54. Consequently there will be generated in the secondary 63 of the transformer a current F—2 having twice the frequency of the source F—1. It will be obvious that any other frequency may be generated by designing the number of anode sectors and rotor slots in the right ratio. It will also be clear that instead of using X anode sectors and Y windows for the lower or generating portion, the proper frequency may be generated by employing Y anode sectors and X windows. Furthermore, the slots may be designed so as to "cut-off" the electron streams in either a sinusoidal manner or in any other manner depending upon the wave-shape desired in the generated currents. While the window or slot 57 in the lower part of the rotor is shown without a vane, it will be understood that a vane may be attached thereto and the device will then be reversible, if the frequency to be changed is applied to transformer 62.

Instead of employing an electron stream to rotate the rotor member to generate the desired current, any conventional manner of effecting such rotation may be employed. Thus as shown in Fig. 12 the rotor member 64 is provided with an armature 65 which is attached to the rotor shaft and mounted to rotate within the restricted portion 66 of the evacuated envelope. A field magnet 67 having a field winding 68 and starting coils 69 cooperates with the armature 65 to rotate the latter. It will be understood that the showing in this respect is merely schematic and that any well known design of synchronous motor structure may be employed. The manner of connecting the anode 70 and cathode 71 in a circuit is shown in Fig. 13 and further description is not deemed necessary. Fig. 13A is similar to the arrangement disclosed in Figs. 10 and 11 with the exception that the device is rotated by a source of direct current 71$^a$, and a pulsating current is generated by members 71$^b$, 71$^c$, etc. Thus the device acts as a current converter.

Figure 14:
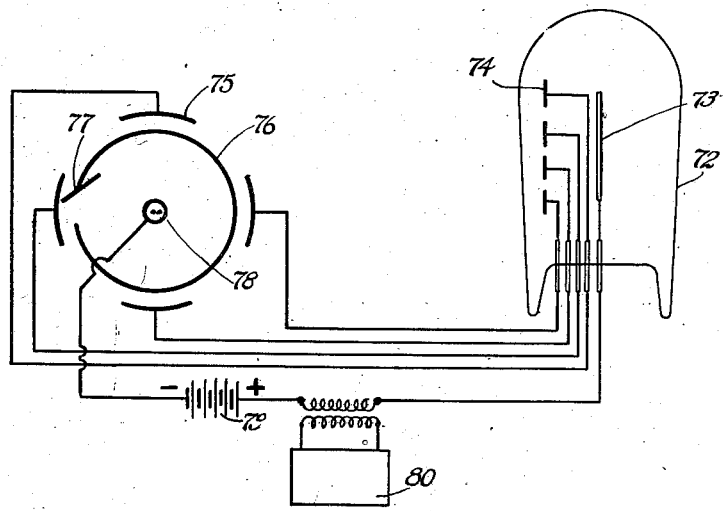
Fig. 14 shows the invention embodied in a commutator.

Referring to Fig. 14 a description will now be given of one manner of using the invention to effect a commutating action. While this figure discloses the invention applied to an arrangement for "switching-in" light sources, it will be understood that this is merely illustrative and it is intended to cover any system wherein accurate timing even at very high speeds and voltages are necessary. By way of example, it may be mentioned that in such systems as television the ordinary type of commutator employing a mechanical contacting brush or the like introduces disturbances due to leakage, wear, non-uniform pressure, etc. These disturbances are particularly objectionable in television and similar signalling systems because they are incorporated in the reproduced image or picture and mar the faithful reproducton thereof. In accordance with the present invention a commutator can be devised which entirely eliminates sparking, wear at contacts, rubbing, etc. Thus as shown in Fig. 14 the numeral 72 represents generally a multi-target lamp of the type disclosed in U. S. patent to C. F. Jenkins No. 1,683,137, comprising a common anode 73 and a set of four cathode glow targets 74. Each of the targets is connected to a corresponding cylindrical anode sector such as described in the preceding figures. A rotor member 76 provided with a vane and aperture 77 is mounted for rotation within the anode sectors, and a central electron emitter 78 is provided as hereinabove described.

A source of potential 79 is connected between the anode 73 of the lamp 72 and the cathode 78. The member 76 may be rotated by any of the arrangements hereinabove described, e. g. Figs. 4, 12, etc. Thus the device may be the same as that disclosed in Fig. 10 wherein the rotor is driven at synchronous speed by the upper anode while the lower anode and cooperating vanes may be as represented in Fig. 14. In the case of a television system it will be understood that the member 76 is rotated at the proper speed ratio with respect to the scanning or analyzing device at the transmitter as set forth in U. S. Patent 1,683,137 supra. In other words member 76 will be rotated once for each complete scanning of the image or representation to be transmitted. Consequently as the window in member 76 registers with a sector 75 a circuit is closed to the associated target 74. Preferably the source 79 is so adjusted that when no image or picture signals are being received from source 80 the targets are just in the neighborhood of the "striking" voltage, when a circuit is completed through the commutator members 75. Consequently the impressing of signals from source 80 will cause the targets to vary in brilliancy in the well-known manner. If desired the source 79 may be omitted and the incoming signals amplified to a sufficient point to light the targets 74. Similarly a separate local potential source may be employed for maintaining the targets 74 just at the point of illumination in the well known manner.

Figure 15:
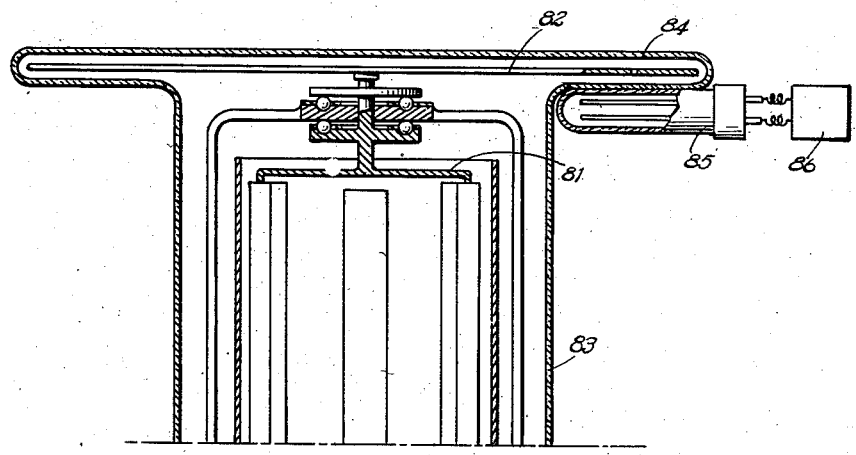
Fig. 15 shows the invention embodied in a television device.

Referring to Fig. 15. there is shown a modification wherein the rotor 81, driven by an electron stream as described above, has fastened thereto a scanning disc 82 of the type well known in television systems as a Nipkow disc. For this purpose the enclosing evacuated envelope 83 is provided with a flattened end portion 84 wherein the disc 82 rotates. Situated adjacent one edge of the disc is a television reproducing lamp 85 which is illuminated to varying brilliancies by the signals from a suitable source 86. If desired the lamp 85 may be formed integrally with the envelope 83, or the luminous electrodes may be mounted within the envelope 83 adjacent the disc 82. In this latter case the envelope may have a filling of inert gas such as neon, helium, etc., which is rendered luminous by the incoming amplified image currents.

Referring to Fig. 16 there is shown a unitary television receiving device wherein the scanning member, driving means therefor, and the reproducing light source are all mounted within a single evacuated envelope. The rotor member 88 in this figure is substantially the same as that shown in Fig. 10, comprising an upper and lower set of vanes and openings. The upper set of vanes cooperates with the corresponding anode sectors 89, and a central electron emitting cathode 90 is also provided. The incoming or local synchronizing currents of the proper frequency are impressed after suitable amplification (in the case of distant or radio transmission) across the anode 89 and cathode 90, thus causing rotor 88 to rotate synchronously with the received currents. Fastened to the rotor shaft 91 is a hollow drum 92 having a plurality of perforations or scanning openings 93 arranged in the path of a multi-turn spiral as set forth in U. S. Patent 1,683,137. The lower set of vanes on rotor 88 cooperate with the lower anode 94 to "switch-in" successively the light targets 95 as described in connection with Fig. 14. It will be understood that each of the targets 95 is connected to a corresponding commutator sector of anode 94 as described. The incoming image or picture currents from source 96 are impressed across the common anode 97 and cause the targets to be correspondingly illuminated as described for Fig. 14. It will be understood of course that in the case of glow discharge targets, the envelope 87 must be filled with the proper gas such as neon, helium, etc. Consequently as the scanning drum 92 is rotated by the electron stream, due to the commutating action of anode 94 the targets 95 are illuminated in succession one for each turn of the drum and reproducing the image or picture in accordance with well-known television principles. It will be understood of course that instead of employing glow discharge targets, that any other equivalent discrete light sources may be employed, e. g. glowing filaments. Furthermore, instead of employing a drum scanner a disc scanner having a plurality of convolutions and a corresponding number of light targets may be employed, or if desired a single spot light source may be employed and a scanner of the type disclosed in application Serial No. 402,918 employed.

While certain specific ways of utilizing the kinetic energy of an electronic or ionic stream have been disclosed, it will be understood that other methods may be employed. For example, as shown in Fig. 17 the rotor member having the vanes 97 may itself be the anode cooperating with the electron emitter 98. Similarly instead of driving the rotor by radial streams of electrons the streams may be generated to strike the movable member tangentially or at any other angle. Thus as shown in Fig. 18 the anode may be provided with vanes which can be acted upon both from a central electron emitter 101, and a tangential emitter 102. In the latter case any well known means as indicated by the numeral 103 may be employed to concentrate the electrons into a well defined path tangentially with respect to the rotating anode. If desired the anode or rotor may be made in the form of intersecting plates which may be driven tangentially from an exterior source of electrons similar to source 102 (Fig. 18).

Fig. 19 shows the invention embodied in a relay suitable for opening and closing circuits in any type of signalling or control system. In this figure the numeral 104 represents the source of emitted electrons, 105 is the anode, and 106 is the rotor carrying the vane 107. This general arrangement may be the same as described for Fig. 1. In addition, however, a pair of contacts 108, 109 are provided and suitably mounted within the enclosing envelope where they will be engaged by the vane 107 or other suitable member carried by the rotor. The numeral 110 represents the circuit device for controlling the operation of the relay and may take the form of any control used in signalling or other systems, and when the device 110 is open, no potential is impressed on anode 105 and rotor 106 will assume its normal position which may be controlled by a suitable rectractile spring (not shown). In this normal position a circuit is closed between wires 111 and 112. When device 110 is closed the rotor 106 is rotated in a clockwise direction and a circuit is completed between wires 111 and 113. This circuit remains closed as long as electrons are impinging on vane 107. The contacts 108 and 109 may serve as limiting stops for the rotor, or separate fixed stops may be employed.

In the examples of Figs. 1 to 16 where the anode is separate from the rotor, the rotor will accumulate a negative charge due to the impinging of negative particles thereon. With very low anode voltage this static negative charge may interfere with the proper operation of the device in which case the rotor may be connected to ground or to a source of suitable positive potential to neutralize this space charge.

In order to increase the kinetic energy and number of particles impinging on the movable members, the enclosing container may contain a quantity of mercury vapor or any other prior art method of increasing the production of electric particles may be employed.

In order to increase the velocity of the electrons impinging on the movable member, a grid-like member may be provided either between the cathode and rotor, or between the rotor and anode or both, said grid being maintained at a suitable positive potential, or at any other potential to reduce space-charging effects, back emission effects, etc., as are well known in the art of electron discharge devices. Similarly when a supplementary grid is employed, a source of alternating potential may be impressed thereon to assist the synchronous operation of the device such as shown in Fig. 4 or if desired the anodes 25 of Fig. 4, for example, may be connected to a source of direct potential and the grid between the anodes and cathode 12 may be supplied with the synchronizing potential.

While specific applications of the electron device are disclosed, it will be understood that it may be employed to control the operation of such devices as time or progress switches, tachometers, speedometers, etc.

Other changes and modifications may be made without departing from the spirit and scope of the invention.

What is claimed is:

1. An electron turbine comprising an electron emitter and a rotor concentrically mounted with respect to said emitter, and an anode concentrically surrounding said emitter and rotor.

2. In combination a source of electrons in the form of a cylindrical surface, a cylindrical anode surrounding said source and a rotor between said source and said anode.

3. In combination a cylindrical surface having an electron emissive coating, means for heating said surface to produce radial streams of electrons, an anode surrounding said surface, and a rotor between said anode and said surface.

4. An electron turbine comprising a linear source of electrons, a rotor surrounding said source, an anode for said source, said rotor having a plurality of members to be acted upon by the kinetic energy of electrons emitted from said source.

5. A cylindrical surface having an electron emissive coating, a rotor surrounding said surface, said rotor having a vane to be mechanically acted upon by the kinetic energy of electrons emitted from said surface, and an anode surrounding said rotor.

6. An electron turbine comprising an evacuated envelope, a rotor rotatably mounted within said envelope, a source of electrons for moving said rotor, and means between said source and said rotor for increasing the velocity of the electrons from said source.

7. An electron turbine comprising an electron emitting cathode, an anode, a rotor, and a grid-like member between said cathode and anode.

ALLEN B. DUMONT.